United States Patent [19]

Schrewelius

[11] 3,781,528
[45] Dec. 25, 1973

[54] HEAT RESISTANT, ELECTRICAL INSULATING HEATING UNIT

[75] Inventor: Nils Gustav Schrewelius, Hallstahammar, Sweden

[73] Assignee: Bulten-Kanthal Aktiebolag, Hallstahammar, Sweden

[22] Filed: May 30, 1972

[21] Appl. No.: 258,099

[52] U.S. Cl................. 219/546, 161/193, 219/457, 219/464, 219/544, 219/553
[51] Int. Cl. .............................................. H05b 3/02
[58] Field of Search.................... 219/407, 455, 457, 219/459, 461, 462, 464, 465, 522, 528, 529, 532, 541, 543, 544, 545, 546, 549, 552, 553; 13/6, 1; 161/89, 142, 193; 65/1

[56] References Cited
UNITED STATES PATENTS

| | | | |
|---|---|---|---|
| 2,180,602 | 11/1939 | Morgan............................ | 219/457 X |
| 2,391,382 | 12/1945 | Bilan................................. | 219/544 |
| 2,878,666 | 3/1959 | Drummond..................... | 161/193 X |
| 2,884,509 | 4/1959 | Heath .............................. | 219/545 X |
| 2,913,565 | 11/1959 | Von Kantzow ................. | 219/464 X |
| 3,086,101 | 4/1963 | Scofield .......................... | 219/464 X |
| 3,417,230 | 12/1968 | Millikan........................... | 219/553 |
| 3,500,444 | 3/1970 | Hesse et al...................... | 219/544 |
| 3,063,198 | 11/1962 | Babcock.......................... | 161/193 X |
| 3,575,789 | 4/1971 | Siefert et al. ................... | 161/193 |
| 3,646,321 | 2/1972 | Siegla............................... | 219/464 |

*Primary Examiner*—Volodymyr Y. Mayewsky
*Attorney*—Granville M. Brumbaugh et al.

[57] ABSTRACT

A heat resistant electrical insulating unit having a rigid body of a ceramic material and a layer of ceramic fiber web bound to the ceramic body into a single unit. The unit may have several layers of rigid ceramic and fiber web layers with the fiber web layers spaced from each other and having an electrical resistance element interposed between them, the outermost rigid bodies being joined together mechanically or being welded together in such a manner that the fiber web layers and the interposed resistance element are held clamped between the rigid ceramic bodies. A method is also disclosed for making heating elements wherein a resistance heating element and the insulating layer or layers are joined together into an essentially two-dimensional unit and are placed on a flat glass ceram body which has been heated to a welding temperature, and thereafter a second glass ceram body which has been heated up to body temperature is placed upon and pressed against the first-mentioned body in such a manner that the two bodies are welded together and enclose at least the edge portion of the said unit all around the same.

7 Claims, 12 Drawing Figures

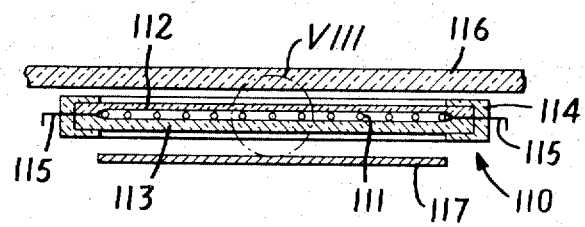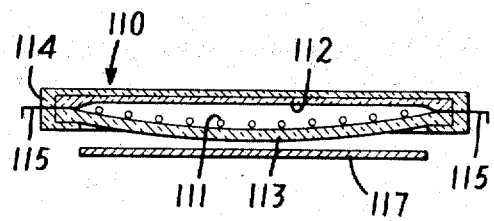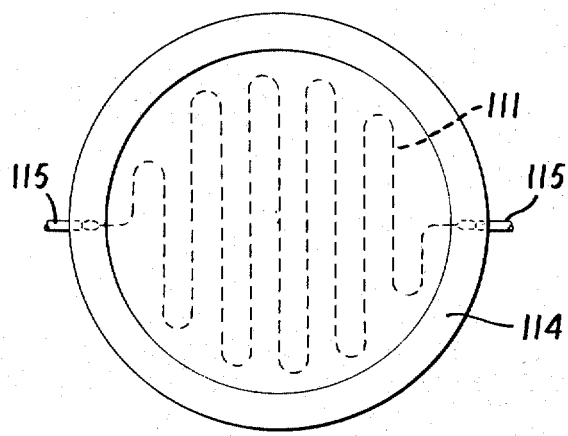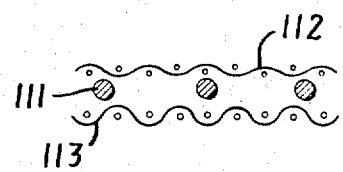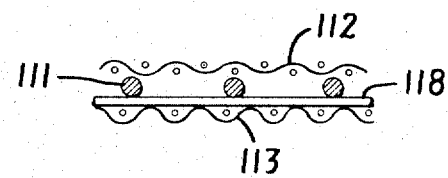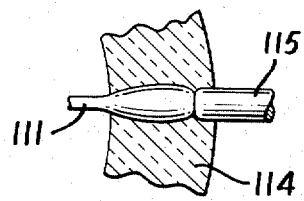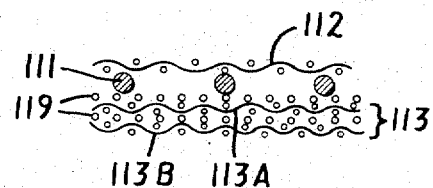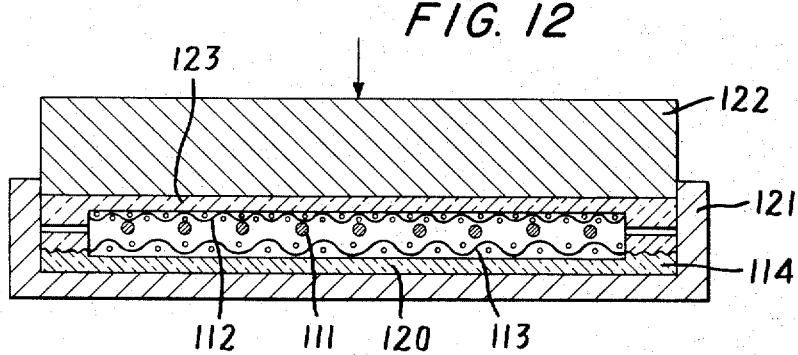

HEAT RESISTANT, ELECTRICAL INSULATING HEATING UNIT

Most ceramic materials are highly heat resistant and have a good electrical insulating capacity. Usually they can also easily be formed into self-supporting bodies having stable shape. However, many of the ceramic materials are somewhat susceptible to knocks and blows, for which reason the utility thereof at times is limited. Also fiber webs of ceramic materials, particularly of quartz glass, are known for their high heat resistance and good electrical insulating capacity. However, such fiber webs have in themselves no shape-stability but have to be stretched out into a frame or the like when used for different insulating purposes.

The present invention has for its object to provide a heat resistant electrical insulating body, which in itself combines the above-mentioned faborable and desired properties of the material, without having to take the less desired properties of the materials into the bargain. To this end the heat resistant, electrical insulating body according to the present invention has been designed as defined in principle in the claims.

Another object of the invention is to provide means, in those cases in which the heating element is completely sealed into the glass ceram, to avoid or minimize the tendency of the quartz glass fabrics to become brittle as a consequence of crystallization caused by excessively high temperatures and also to avoid deterioration of the glass ceram by reason of such high temperatures.

The invention will be disclosed in more detail below with reference to the accompanying drawings.

FIG. 4 is a schematical plan view of a hot plate or the like;

FIG. 5 shows schematically and in axial section a hot plate according to the present invention;

FIG. 6 is a plan view of the hot plate in FIG. 5;

FIG. 7 is a section corresponding to FIG. 5 and shows the hot plate in FIG. 5 in operation as well as a modification of this hot plate;

FIG. 8 shows to an enlarged scale but still schematically the portion within a circle VIII in FIG. 5;

FIGS. 9 and 10 are sectional views corresponding to FIG. 8, which show alternative embodiments;

FIG. 11 shows to an enlarged scale a connection for the resistance wire in the hot plate in FIG. 5; and FIG. 12 shows schematically and in axial section a forming tool and illustrates one method for the manufacture of a hot plate as shown in FIG. 5.

Figure 1:
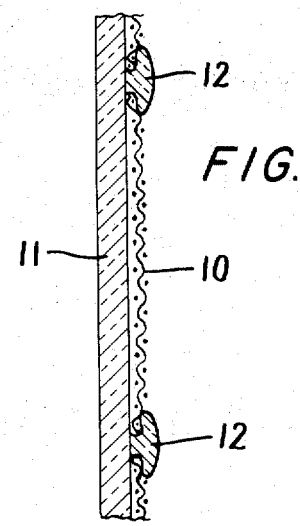
FIG. 1 shows in section a part of a heat resistant, electrical insulating body according to the invention in a simply embodiment thereof.

In the embodiment as shown in FIG. 1 the body according to the present invention consists of a glass fiber web 10, which at one side thereof is supported by a ceramic body 11. The glass fiber web 10, that preferably consists of quartz glass, i.e., contains about 98–99% $SiO_2$, need not in itself be a woven material in the full sense of that word. Also knitted, crocheted or other kinds of bound layers may be used. The ceramic body 11 may consist of glass, e.g., of the type that has a very low coefficient of thermal expansion and is based on $Li_2O$—$Al_2O_3$—$SiO_2$. It may also consist of e.g., stabilized zirconium oxide, $ZrO_2$, zirconium silicate, $ZrSiO_4$, or mullit.

Preferably, the glass fiber fabric 10 is rigidly bound to the ceramic body 11, which may be achieved in several different ways. In the embodiment shown the glass fiber fabric 10 has been provided with holes, through which spot-shaped layers 12 of a suitable ceramic material have been applied by so-called plasma-spraying, so that the spots on one hand stick to the body 11 and on the other hand overlap the hole edges at least partly, so as thereby to hold the glass fiber fabric 10. If the glass fiber fabric 10 is coarse meshed enough the bond may be achieved by spraying the ceramic binding agent through the meshes.

Figure 2:
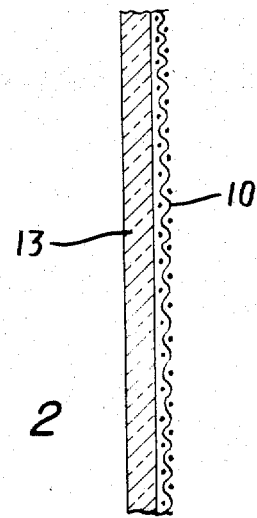
FIG. 2 shows a modified embodiment of the body according to the invention.

In the embodiment in FIG. 2 the ceramic body 13 does not consist of a pre-manufactured body, but instead a layer of a suitable ceramic material, e.g., one of the above-mentioned mentioned materials, which has been applied to one side of the glass fiber fabric 10 by plasma-spraying or the like. For certain special applications it may also be advantageous to apply a similar thicker or thinner ceramic material layer also to the other side of the glass fiber fabric.

A heat resistant, electrical insulating body as disclosed above is useful in practice for a plurality of purposes and has many advantageous properties. Thus, for instance, it may be used as a protection against touching and as a diffuser in connection with heat sources of various kinds. In such applications the ceramic body 11,13 provides the shape-stability, so that the body may be easily mounted as a unit, whereas the glass fiber fabric 10 along with the ceramic body provides for the desired distribution of the heat, which is supplied from one side. If it is a question of heat emission from electrical resistance elements, the glass fiber fabric 10 ensures that the resistance element is prevented from coming into a usually undesired contact with the ceramic body 11, 13. Further, the glass fiber fabric 10 may serve as a remaining protection against touching in case the ceramic body 11,13 is damaged. The fact that this protection against touching always remains, permits the ceramic layer 11,13 to be made comparatively thin, which at times may be very desirable, such as for reducing the heat capacity of a hot plate.

Figure 3:
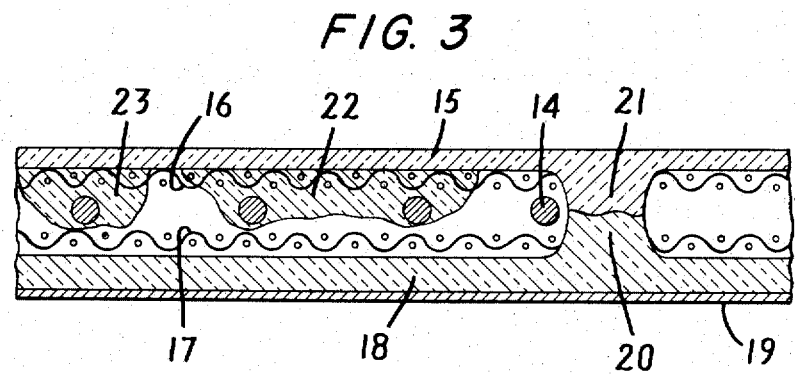
FIG. 3 shows in section one part of an electrical hot plate or the like, wherein the body according to the present invention is included as an integral part.
Figure 4:
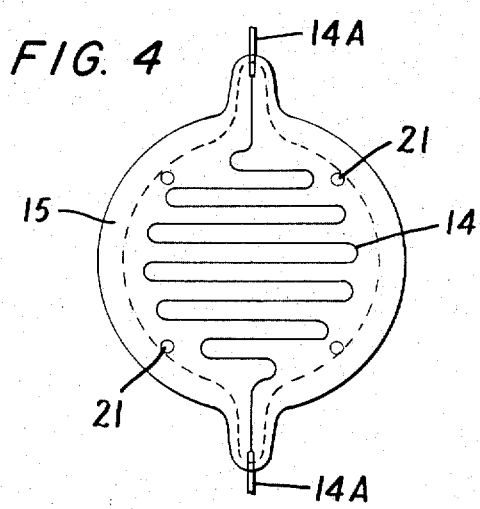

A practical use of the heat resistant and electrical insulating body according to the present invention is shown in FIGS. 3 and 4, wherein the body in question is used as a part of an electrical hot plate.

The electrical hot plate in FIGS. 3 and 4 consists of a resistance element 14, preferably in the shape of a zig-zag or meander-shaped resistance wire, for instance, of the material being sold under the registered Trade Mark "KANTHAL" or "KANTHAL Super" (a homogeneous and pore-free material substantially consisting of molybdenum disilicide, $MoSi_2$) or any other heat resistant resistance material, like molybdenum or nickel-chrome. Preferably, the resistance wire is provided with electrode ends 14A, which may be dimensioned slightly heavier than the rest of the wire.

As shown particularly clearly in FIG. 3 the upper side of the hot plate consists of a heat resistant and electrical insulating body according to the present invention. For example, this body consists of a circular plate 15 of a glass of the above-mentioned type. Below the glass plate 15 there is disposed a quartz glass fabric 16, which forms an intermediate layer between the resistance element 14 and the glass plate 15. Further, in the example there is disposed beneath the resistance element 14 a further glass fiber layer 17, that in turn rests on a lower glass plate 18. On its underside the lower glass plate 18 has a reflecting layer 19, e.g., in the form of an aluminium foil, a sprayed on aluminium layer or the like.

The hot plate may be held together by holding the glass plates 15,18 together by means of a surrounding frame, which is simultaneously used for the mounting of the hot plate. Instead thereof or beyond such fastening together it is also possible to weld together the glass plates, e.g., around the edges or at special protusions 20,21, which may pass through holes in the glass fiber webs. In most cases it appears to be sufficient to keep the element 14 and the glass fiber layers 16,17 confined between the glass plates 15,18. However, it has also been contemplated to spray on the glass fiber layer 16 and the element 14 to the underside of the glass plate 15 by plasma-spraying, as indicated by the layers 22,23.

Referring generally to FIGS. 5–12, inclusive, the hot plate 110 as shown in FIG. 5 has as a heat generating element a resistance wire 111, that forms a flat meander and may consist e.g., of the material which is commercially available such as "KANTHAL" or "KANTHAL Super" referred to above. As is shown more clearly in FIG. 8, the resistance wire 111 is interposed between two fabric layers 112 and 113; these fabric layers, as noted above, need not be woven fabrics in the full sense of this expression, but knitted or crocheted or other kinds of bound layers may be contemplated.

The disc-like unit formed by the resistance wire 111 and the fabric layers 112 and 113 is held by a circular frame 114 of glass ceram, through which the conduits 115 for the resistance wire are led in. Above the hot plate 110 there is a suitable cover 116 and below the hot plate 110 there is disposed a reflector 117.

The fabric layers 112 and 113 consist of quartz glass, i.e., glass containing 98–99% $SiO_2$. The uppermost fabric layer 112 may have a thickness of 0.3 mm for instance. The lowermost layer 113 is in this example thicker than the uppermost one and may have a thickness of 1.2 mm, for example, this is because the lowermost layer has to support the resistance wire 111, which in operation has no supporting capacity of its own. In operation the lowermost fabric layer is pressed slightly downwardly by the resistance wire, so that it forms a sort of a loop. This is clearly shown in FIG. 7.

As mentioned the frame 114 consists of glass ceram, that is a glass material which is characterized among other things by an ability to stand very elevated temperatures and having a very low coefficient of thermal expansion. As an example of such materials there may be mentioned a glass based on $Li_2O—Al_2O_3—SiO_2$. In the embodiment as shown in FIG. 7 the frame completely covers the unit formed by the resistance wire 111 and the fabrics 112 and 113. However, the lowermost side of this unit is free in the same way as shown in FIGS. 5 and 6.

Each lead-in electrode 115 for the resistance wire 111 consists of a strip, e.g., of chromium-nickel, having one end welded or brazed-on to a thickened end portion of the wire and being embedded into the frame 114 by melting or in any other suitably way. This is shown in FIG. 11.

FIGS. 9 and 10 show two modified embodiments. In the embodiment in FIG. 9 bars or rods 118 of a highly heat resistant material, e.g., sillimanit, are interposed between the resistance wire 111 and the lowermost fabric layer 113. Such rods serve to enhance the movements of the resistance wire in relation to the lowermost fabric layer. In FIG. 10 the lowermost fabric layer 113 is composed of two fabric layers 113A and 113B, which are put together and each of which may have a thickness of e.g., 0.6 mm. On both sides of the layer 113A adjacent the resistance wire there is a layer 119 of a granulated ceramic material, e.g., sillimanit or alumina. Like the rods 118 these layers 119 are intended to enchance the movements of the resistance wire relative to the fabric layer 113. Of course this may be achieved also if only the side facing the resistance wire proper has a granule layer 119, but in such a case a bi-metallic-like function may arise, and, therefore, it is to be preferred to have a layer on both sides.

Both the rods 118 and the layers 119 result in avoiding too close a contact between the resistance wire 111 and the supporting lowermost fabric layer 113. Owing to the fact that this lowermost layer is composed of two layers 113A and 113B it is also found that the layer in question becomes more flexible than a single layer of the same thickness and that the embrittlement that may arise after an extended period of operation is limited to one side only of the layer, i.e., the fabric layer 113A. Of course, the use of two fabric layers in the lowermost layer is not limited to the embodiment as shown in FIG. 10 but may be applied also in the other embodiments.

In manufacture of a hot plate as shown, the circular fabric layers 112 and 113 with the interposed resistance wire 111 are brought together to one single unit, e.g., by means of sewing with quartz glass thread. The individual meanders on the resistance wire are locked in relation to the fabric layer by extra stitches of the quartz glass thread. Then, the glass ceram frame 114 is placed above this unit in a press moulding tool. One example of this step of the manufacture is shown schematically in FIG. 12. A disc 120 heated to a welding temperature of the glass ceram is then placed into or formed in a form 121 and on such disc the unit formed by the resistance wire 111 and the fabric layers 112 and 113 with the lead-in electrodes is then placed in a suitable way. On the said disc there is then placed a body of glass ceram of sufficient size and preformed if desired, which body is similarly heated up to a welding temperature and which is then pressed out by means of a stamp 122, so it forms a disc 123. This disc is welded together with the disc 120 at the edge portion, so that the resistance wire 111 and the fabric layers 112 and 113 will be completely enclosed within the glass ceram. The fabric layers 112 and 113 prevent the discs 120 and 123 from sticking to the resistance wire during the pressing operation. The central portion of one of the discs 120 and 123 or both of them may then be cut away, so that the frame 114 will then be open on at least one side but still encircles the edge portion of the fabric layers.

Of course it is also possible to make the frame 114 open on one side thereof or on both sides by providing the form 121 and/or the stamp 122 with a disc-shaped filling body corresponding to the opening. Another possibility would be to use pre-manufactured rings which may be assembled around the unit comprising the resistance wire and the fabric layers and which are joined together in any suitable way, e.g., by welding, brazing or sintering. Preferably, such rings would consist of glass ceram, but they may also at least partly consist of another ceramic material or of metal.

It should be mentioned that at least one of the fabric layers may be impregnated with a suitable agent to prevent or delay embrittling of the fabric.

In the foregoing the invention has been explained by taking an electrical hot plate as an example. Of course this does not mean that the applicability of the invention is limited to electrical hot plates inasmuch as it may also be applied to other heating sources or heating elements, even those which do not possess the disc-shape which characterizes the example.

What is claimed is:

1. An improvement in electrical resistance heating elements, particularly hot plates and similar heat sources comprising a resistance wire for elevated temperatures, wherein the resistance wire is interposed between two separate insulating layers of ceramic material, at least one of said insulating layers forming a resilient quartz glass fiber web comprising at least about 98% $SiO_2$ for supporting the resistance wire, the two insulating layers and the interposed resistance wire being supported by a unitary rigid body of glass ceram, said unitary body of glass ceram being in one piece and forming a surrounding rigid frame which has been pressed on to the edge portions of the insulating layers.

2. An improvement as in claim 1, wherein the resistance wire rests on at least one of the insulating layers through an intermediate layer, which facilitates the movements of the wire in relation to the layer.

3. An improvement as in claim 2, wherein the intermediate layer consists of a layer of ceramic material of a group consisting of sillimanite and alumina.

4. An improvement as in claim 2, wherein the intermediate layer consists of slightly spaced rods of a highly temperature resistant material such as sillimanite, arranged transversely to the resistance wire.

5. An improvement as in claim 2, wherein the intermediate layer is disposed on the surface of the insulating layer facing the resistance wire and a similar layer is disposed on the other side of the insulating layer.

6. An improvement in electrical resistance heating element, particularly hot plates and similar heat sources comprising a resistance wire for elevated temperatures, the resistance wire being supported by means of a body of glass ceram, said resistance wire being interposed between two insulating layers of ceramic fabric, and being supported by one of said insulating layers which insulating layer and said resistance wire are supported by a surrounding rigid frame which is open at at least one side thereof, said rigid frame comprising a unitary glass frame in one piece, which has been pressed onto the edge portions of the insulating layers.

7. An improvement in electrical resistance heating element, particularly hot plates and similar heat sources comprising a resistance wire for elevated temperatures, the resistance wire being supported by means of a body of glass ceram, said resistant wire being interposed between two insulating layers of ceramic fabric, and being supported by one of said insulating layers which insulating layer and said resistance wire are supported by a surrounding rigid frame which is open at at least one side thereof, said resistance wire resting on said insulating layer through an intermediate layer of slightly spaced rods of a highly temperature resistant material such as sillimanite, arranged transversely to the resistance wire, thereby to facilitate movements of the wire in relation to the layer.

* * * * *

PO-1050
(5/69)

UNITED STATES PATENT OFFICE
CERTIFICATE OF CORRECTION

Patent No. 3,781,528     Dated December 25, 1973

Inventor(s) NILS GUSTAV SCHREWELIUS

It is certified that error appears in the above-identified patent and that said Letters Patent are hereby corrected as shown below:

<u>First page, line 18, of Abstract</u>, "body temperature" should read --welding temperature--;

<u>Col. 1, line 17</u>, "faborable" should read --favorable--;

<u>line 35</u>, "simply" should read --simple--;

<u>Col. 2, line 19</u>, delete "mentioned" (second occurrence);

<u>Col. 3, line 43</u>, "example, this" should read --example. This--;

<u>line 64</u>, "suitably" should read --suitable--;

On the cover sheet, insert -- [30] Claims Foreign Priority Data

| | | |
|---|---|---|
| Sweden | 14014 | Nov. 3, 1971 |
| Sweden | 6027 | May 10, 1971 -- . |

Signed and sealed this 13th day of August 1974.

(SEAL)
Attest:

McCOY M. GIBSON, JR.      C. MARSHALL DANN
Attesting Officer     Commissioner of Patents